(No Model.)
M. MAIS.
VEHICLE BRAKE.
No. 280,939. Patented July 10, 1883.
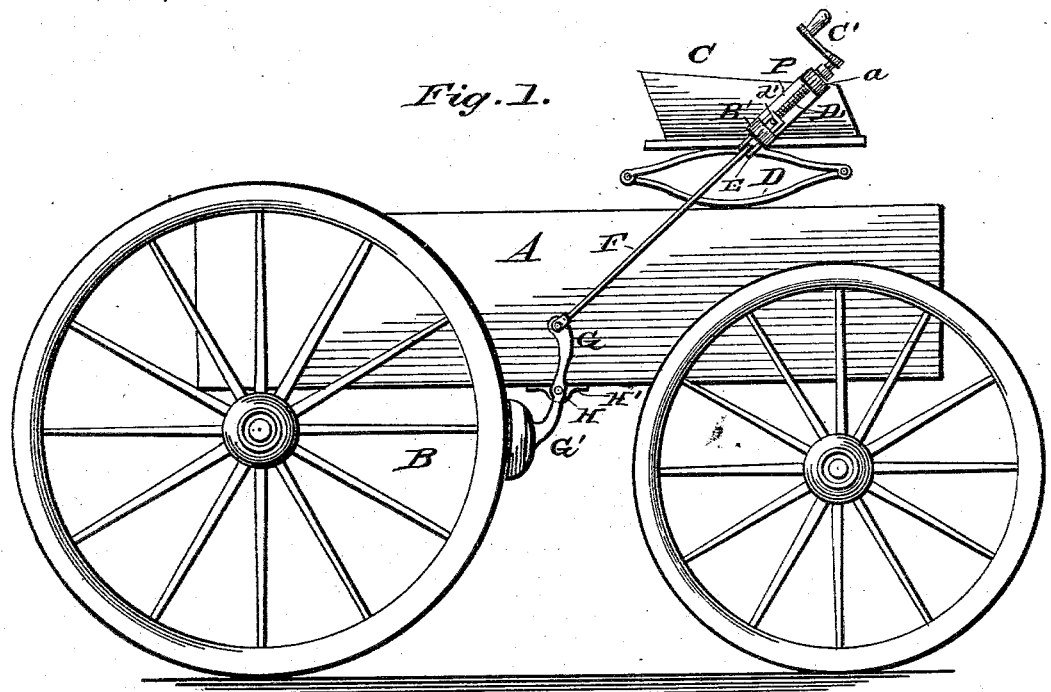
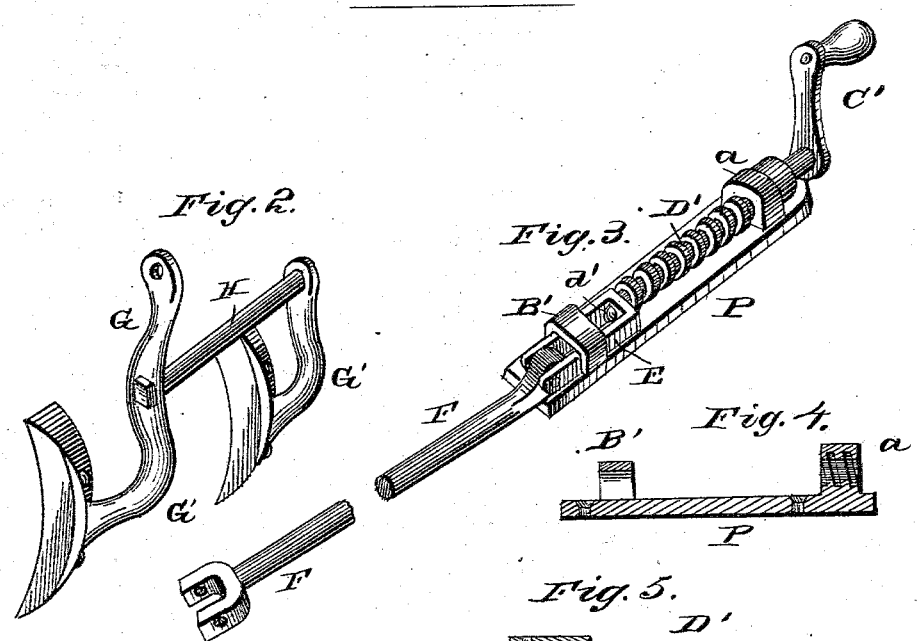
WITNESSES
Phil C. Dieterich
W R Keyworth
INVENTOR
Michel Mais
by
P. H. Alexander
Attorney.
N. PETERS, Photo-Lithographer, Washington, D. C.

UNITED STATES PATENT OFFICE.

MICHEL MAIS, OF SOUTH BEND, INDIANA.

VEHICLE-BRAKE.

SPECIFICATION forming part of Letters Patent No. 280,939, dated July 10, 1883.

Application filed April 25, 1883. (No model.)

*To all whom it may concern:*

Be it known that I, MICHEL MAIS, of South Bend, in the county of St. Joseph and State of Indiana, have invented certain new and useful Improvements in Brakes for Vehicles; and I do hereby declare that the following is a full, clear, and exact description thereof, reference being had to the accompanying drawings, and to the letters of reference marked thereon, which form part of this specification, in which—

Figure 1 is a side view of a wagon, showing my improved brake applied to it. Fig. 2 is a perspective view of the brake-shoes detached from the wagon. Fig. 3 is a perspective view of the device for adjusting the brake-shoes. Fig. 4 is a sectional view of the face-plate, the fixed nut, and the guide-loop. Fig. 5 is a detail of a portion of the adjusting-screw, the swivel, and the sliding clip.

This invention relates to devices for actuating brakes for vehicles; and it consists, mainly, in a screw-threaded shaft, in combination with a swivel, a sliding clip, a connecting-rod, and a brake, which are constructed and applied to a vehicle, as will be fully understood from the following description, when taken in connection with the annexed drawings.

A designates the body or box of a vehicle; B, the left-hand wheel thereof; C, the seat, and D the seat-spring.

P designates a face-plate, which is rigidly secured to the left-hand side of the seat, and constructed with an internal screw-threaded projection, *a*, near one end, and a loop, B', near the other end.

D' designates a screw-threaded shaft, on one end of which is a hand-crank, C'. This shaft passes through a screw-threaded nut, *a*, above referred to, and its crank-handle is in such close relation to the driver when in the seat C that he can conveniently turn the shaft D' and apply the brakes or release them at will.

E designates a bifurcated clip, to which the shaft D' is connected by a swivel, *d'*, which clip is guided in its endwise movements by the loop B'. To the clip E is pivoted one end of a rod, F, the opposite end of which is pivoted to the extension G of one of the levers, G', to which the brake-shoes are secured. The horizontal transverse shaft H of the brake-levers is free to oscillate in boxes H', which are rigidly secured to the bottom of the wagon-box A, and so arranged with reference to the wheels of the vehicle that by simply turning the shaft D' the brakes can be forcibly applied to the wheels or removed therefrom.

I have shown in the drawings my brake with the plate P attached to the driver's seat; but it is evident that the said plate may be attached to the wagon at any place within convenient reach of the driver.

I am well aware that it is not broadly new to operate a wagon-brake by means of a screw-shaft, and therefore do not claim, broadly, such a device.

Having described my invention, what I claim as new, and desire to secure by Letters Patent, is—

The combination, in a wagon-brake, of the plate P, provided with screw-threaded projection *a* and loop B', with the screw-threaded shaft D', bifurcated clip E, rod F, levers G G', boxes H', and crank C', all constructed and adapted to operate substantially in the manner and for the purposes described.

In testimony that I claim the foregoing as my own I affix my signature in presence of two witnesses.

MICHEL MAIS.

Witnesses:
 JAMES DUSHANE,
 JOHN WAGENER.